United States Patent [19]
Ray et al.

[11] Patent Number: 6,096,678
[45] Date of Patent: Aug. 1, 2000

[54] PROCESS FOR THE PREPARATION OF SUPPORTED ALUMINIUM CHLORIDE CATALYST CONTAINING ORGANO ALUMINIUM COMPOUND

[76] Inventors: Sabyasachi Sinha Ray, House No. B-65, Sarita Vihar, New Delhi-110044; Rakesh Sarin, House No. 2204, Sector-9; Deepak Kumar Tuli, House No. 866, Sector-9, both of Faridabad-121006; Madan Mohan Rai, House No. 886, Sector-15; Sobhan Ghosh, House No. 188, Sector-14, both of Faridabad-121007; Akhilesh Kumar Bhatnagar, House No. 205, Sector-7A, Faridabad-121006; Swaminathan Sivaram, C-II/2, NCL Colony, Pune 411 008; Thekke Pangil Mohandas, B-104, Ashit Apartments, Sudhir Pawar Path, Modi Baug, Pune 411 016; Dattatraya Haribhau Gholap, E-28, NCL Colony, Pune 411008; Mallinamadugu Jogimarappa Gari Yanjarappa, New Hostel, NCL, Pune 411 008, all of India

[21] Appl. No.: 09/064,138

[22] Filed: Apr. 22, 1998

[51] Int. Cl.[7] ............................ B01J 31/00; B01J 27/125; C07C 2/24; C07C 2/02

[52] U.S. Cl. ......................... 502/152; 502/169; 502/231; 585/512; 585/521

[58] Field of Search ............................... 585/512, 521; 502/152, 169

[56] References Cited

U.S. PATENT DOCUMENTS

| | | | |
|---|---|---|---|
| 3,787,384 | 1/1974 | Stevens et al. | 260/94.9 |
| 4,359,403 | 11/1982 | Hoff et al. | 252/429 B |
| 4,721,762 | 1/1988 | Commereuc et al. | 585/512 |
| 4,740,652 | 4/1988 | Frame | 585/512 |
| 4,795,851 | 1/1989 | Frame et al. | 585/512 |
| 5,789,335 | 8/1998 | Chen et al. | 502/169 |

OTHER PUBLICATIONS

S. Sato et al., "Liquid–phase alkylation of benzene with cyclohexene over $SiO_2$–grafted $AlCl_3$ catalyst and accelerating effect of ultrasonic vibration", Applied Catalysis A: General 143, 271–281 (1996).

E.E. Getty et al., "Preparation, characterization, and catalyst activity of a new solid acid catalyst system", Inorg. Chem. 1990, 29, 1186–1192.

J. Skupinska, "Oligomerization of α–olefins to higher oligomers", Chem. Rev. 1991, 91, 613–648.

K. Tanabe, "Catalysis by novel solid strong acids and super acids", Shapiero, B.L. Ed., Texas A & M University Press, College Station Texas, 1984, 71–94.

F. Esser et al., "Cyclic guanidines. Part 2. Rearrangement of N–substituted 2–arylamino–4,5,6,7–tetrahydro–1H–1,3–diazepines. X–ray molecular structure of 1–(2, 6–dichlorophenyl)–2(2–methylallylimino)hexahydro–1, 3–diazepine", J. Chem. Soc. Perkin Trans. I, 110, 3311–3316 (1988).

G. Fuentes et al., "n–Butane isomerization catalyzed by supported aluminum chloride", J. Catalysis, 78, 436–444 (1982).

Primary Examiner—Mark L. Bell
Assistant Examiner—J. Pasterczyk
Attorney, Agent, or Firm—Venable; George H. Spencer; Charles C. Rories

[57] ABSTRACT

A process for the preparation of an inert oxide supported metal halide organo aluminium compound catalyst. The catalyst is obtained by reacting an activated support having surface hydroxyl groups with aluminium chloride selected from aluminium chloride solution and aluminium chloride vapors. A solution of an aluminium alkyl is added to the reacted support. The solvent is removed and the reacted support is dried.

13 Claims, No Drawings

PROCESS FOR THE PREPARATION OF SUPPORTED ALUMINIUM CHLORIDE CATALYST CONTAINING ORGANO ALUMINIUM COMPOUND

FIELD OF INVENTION

This invention relates to a process for the preparation of supported aluminum chloride catalyst containing organoaluminum compound supported an a suitable inorganic support such as silica. The catalyst prepared by the process of the present invention is capable of oligomerizing and co-oligomerizing olefins giving alpha olefin in oligomers and co-oligomers with high catalyst activity at high temperatures.

PRIOR ART

Anhydrous aluminum chloride in presence of labile proton promoters are well known for oligomerization of higher ($>C_4$) alpha olefins (Chem. Rev. 1991, 91, 613–648). Quantitative conversion of olefins, however, needs 1.5–5% by weight of aluminum chloride. This results in the presence of large chlorine content in the product oligomer, which is undesirable in many applications of these products.

Boron trifluoride ($BF_3$) along with water or alcohol as promoter has been widely used for oligomerization of alpha olefins or their mixtures. The reaction is usually carried out at temperatures between 10–60° C. A preferred means of accomplishing this is by adding baron trifluoride to the olefins containing the requisite amount of water/alcohol promoter. Boron trifluoride is continuously introduced to complete the oligomerization. Subsequently, the catalyst is removed and the oligomer hydrogenated to produce useful synthetic lubricants. However, boron trifluoride which is a gaseous material has the disadvantage of being hazardous, injurious to health (pulmonary irritant) and necessitates disposal of inorganic fluorides in effluent which is environmentally unsafe.

The above disadvantages of Lewis acid catalysts can be obviated by supporting the Lewis acid on a suitable inert inorganic support. The preparation of supported aluminum chloride catalysts, active in isomerization, cracking, hydrocracking, dehydration, alkylation and acylation reactions, are well documented in the prior art (Tanabe, K., in Heterogeneous Catalysis by Novel Solid Strong Acids and Superacids, Shapiero, B. L. Ed., Texas A & M University Press, College Station Tex., 1984 pp. 71–94). The preparation and characterization of solid catalysts containing stable tetrahedral aluminium have been reported (J. Chem. Soc. 110 3311 (1988). Anhydrous aluminium chloride supported on inorganic oxides have been reported (Inorg. Chem. 1990, 29, 1186–1192., and J. Catalysis, 1982, 78, 437–444.). In these examples, supported aluminum chloride has been used at relatively low temperatures. Silica supported aluminum chloride and supported aluminum chloride catalysts have been shown to be active for Friedel Crafts alkylation reactions. (Applied Catalysis A:General, 143, 271, 1996). However, all these reactions have been conducted at less than 50° C.

OBJECTS OF THE INVENTION

It is therefore an object of the present invention to propose process for the preparation of supported aluminum chloride catalyst containing organoaluminum compound, capable of exhibiting high catalyst activity at substantially higher temperatures, namely, greater than 100° C., preferably, greater than 150° C.

It is also an object of the present invention to propose a catalyst by the deposition of aluminum chloride onto a high surface area carrier such as silica, affording a superior impregnated catalyst for oligomerization/co-oligomerization of alpha olefins.

Another object of the present invention is to propose a supported aluminum chloride catalyst which can be beneficially activated by an organoaluminum compound.

DESCRIPTION OF THE INVENTION

The solid catalyst for alpha olefin oligomerization/co-oligomerization according to the present invention is characterized in that the said catalyst comprises of:

a) a particulate carrier composed of an oxide of at least one selected from among those belonging to the groups III, IV of the periodic table having a specific surface area of about 300 $m^2/g$ and containing at least 3 mmol of hydroxyl group per gram of the oxide;

b) a metal compound belonging to the group III of the periodic table with at least three halogen atoms attached to it;

c) an organoaluminum compound of the formula Al $R_n X_{3-n}$.

Accordingly the present invention provides a process for the preparation of supported aluminum chloride catalyst containing organoaluminum compound which comprises preparing a solution of the aluminum chloride in an organic solvent to give a homogeneous solution, separately activating the support, refluxing the activated support with the solution of aluminum chloride for a period of 3–10 hours, removing the solvent by conventional methods, preparing a slurry of supported aluminum chloride in an hydrocarbon solvent, removing the hydrocarbon solvent under inert atmosphere to obtain the catalyst, drying the catalyst at a temperature ranging between 80 to 120° C., adding to the catalyst solution of organoaluminum compound, to obtain the supported aluminum chloride catalyst combined with the aluminumorganic complex.

It has now been found that the combination of the aluminum chloride and the organoaluminum compound enables the oligomerization and co-oligomerization of olefins giving alpha olefin oligomers and co-oligomers with high catalytic activity at high temperature. It is therefore essential to provide a process for the preparation of aluminum chloride catalyst combined with the organoaluminum complex.

In an embodiment of the present invention the organic solvent used for preparing the solution of aluminum chloride is selected from halogenated organic solvents, preferably chlorinated solvents, exemplified by carbon tetrachloride, 1,2-dichloroethane, chloroform, chlorobenzenes and chlorotoluenes.

The support used is selected from silica, alumina, silica-alumina or mixture of these oxides.

The hydrocarbon solvent used for the preparation of slurry or aluminum chloride supported on the support is selected from aromatic or aliphatic hydrocarbons or mixture thereof, exemplified by benzene, toluene, hexane etc.

The organoaluminum compound is diluted with an aromatic or aliphatic solvent such as benzene, toluene, xylene, hexane or heptane and impregenated onto silica after impregnating aluminum chloride or directly introduced into the reaction along with supported aluminum chloride catalyst at the time of oligomerization reaction. The organoaluminum compound used has the general formula. $R_n AlX_{3-n}$ wherein R is an alkyl group having carbon number between $C_1$ to $C_6$ and X=F, Cl, Br, preferably Cl, and n has a value between 0.5 to 2.0.

The inert gas used may be selected from argon, nitrogen or alike.

The support is activated by subjecting the support to a temperature ranging between 150–350° C., preferably between 160–175° C. for a period of 12–36 hours, preferably for 24 hours;

The anhydrous aluminum chloride is deposited on the carrier in the vapor phase without the use of the chlorinated solvent. In this case, support is packed into a tubular column and vapors of anhydrous aluminum chloride diluted with an inert carrier gas, namely, nitrogen or argon, is swept over the column. The packed column of silica is maintained in the temperature range of 50 to 150° C., preferably, 75 to 100° C.

The inert support material should be dry i.e. free of absorbed water. Drying of the carrier materials is effected by heating at a temperature of about 150° C. or more Higher the calcining temperature, lower the amount of hydroxyl group on the support. Temperature of 125 to 500° C. can be used with the preferred temperature range being between 150–200° C. Modification of the support in this manner provides the catalyst composition with increased activity.

The quantity of hydroxyl groups in the support depends upon the nature of the support employed, as its specific area on the physicochemical treatment and on drying to which it may have been subjected before hand. A support ready for use generally contains 0.1 to 2.5, preferably 0.5 to 1.5 mmols of hydroxyl groups per gram of the support. The support which may be granular, is preferably devoid of water at the time of its use in the catalyst preparation. For this purpose, it is preferably made free of water by means which are well known, such as heat treatment ranging from 125 to 500° C. The support is chosen, in particular, from a silica, alumina silica-alumina or a mixture of these oxides and consist of particles which have a mass mean diameter ranging from 30 to 240 microns especially from 50–150 microns. The use of silica is preferred, especially the one sold by Davison Chemical under the commercial reference Davison 952.

The process of the present invention is described below with examples which are only illustrative and should not be construed to limit the scope of the present invention in any manner.

EXAMPLE 1

All gases equipment were heated and flushed with nitrogen. All manipulations involving air sensitive compounds were performed in an inert-atmosphere glove box continuously purged with high purity nitrogen or under a positive pressure of high purity nitrogen using standard bench top inert atmosphere techniques. Solvents used in each run was freshly distilled under nitrogen. Aluminum was estimated titrimetrically using EDTA. Chlorine was estimated by argentometric method.

A support, namely, 'Davison 952' silica powder sold by Davision Chemical Company which has a specific surface area of 300 $m^2/g$, a pour volume of 1.65 cc/g and 2.8 mmol of hydroxyl groups/g was employed. It was dried at 160° C. for 24 hours to obtain a silica powder free of water and containing less than 1.5 mmol hydroxyl groups per gram of silica.

In a three neck round bottom flask equipped with magnetic needle, reflux condenser, nitrogen inlet and outlet tubes, 10 g of activated silica powder was placed. In a separate round bottom flask, 0.54 g of aluminum chloride as dissolved in freshly distilled carbon tetrachloride at 70° C., under nitrogen atmosphere. The homogeneous solution was introduced, using a canula under nitrogen pressure, into the throw necked flask containing the silica powder and the contents were refluxed for 6 hours. The reaction is accompanied by the evolution of hydrogen chloride gas.

The slurry was cooled to room temperature under nitrogen and the supernatant carbon tetrachloride was removed using a canula under nitrogen pressure.

0.18 g of diethyaluminum chloride (approximately 10% solution in n-hexane was added to the above and the product was dried at about 120° C. under stirring and nitrogen atmosphere.

EXAMPLE 2

In a three necked round bottom flask equipped with magnetic needle, reflux condenser and nitrogen inlet and outlet, 0.54 g of aluminum chloride was placed. About 100 mL of carbon tetrachloride, freshly distilled, was introduced into the flask and the slurry was heated to completely dissolve the aluminum chloride. Subsequently, 10 g of previously activated silica powder was introduced into the reaction flask and refluxed for 6 hours. The process is accompanied by evolution of hydrogen chloride gas.

The slurry allowed to cool to room temperature, the supernatant solvent was removed using a canula and the contents dried under nitrogen. Diethylaluminum chloride, 0.18 g, dissolved in n-hexane or toluene (approximately 10% solution) was then introduced into the flask and stirred for an hour. The slurry was evaporated to dryness under a nitrogen atmosphere.

EXAMPLE 3

About 25 g of activated silica was taken in a 2" diameter glass tubular column equipped with a porcelain disc at the bottom of the tube and gas inlet and outlet delivery tubes. The tube was flushed with nitrogen and the silica was kept heated around 75° C.

2.5 g of anhydrous aluminum chloride was heated in a modified sublimation apparatus and the vapors were carried using a nitrogen gas carrier into the tubular column containing silica. 1.8 to 2.0 g of $AlCl_3$ was sublimed and the contents in the column were allowed to cool under nitrogen atmosphere.

About 0.5 g of Diethyaluminum chloride (approximately 10% solution in n-hexane) was added to the above and the product was dried at about 120° C. under stirring and nitrogen atmosphere.

We claim:

1. A process for the preparation of an activated supported aluminum halide organo aluminum compound catalyst which comprises the steps of reacting an activated support having a hydroxyl group content in the range of 0.5 to 2.0 mmol/gram of said support with aluminum chloride in a phase selected from the group consisting of aluminum chloride solution and aluminum chloride vapors, adding a solution of an aluminum alkyl to the reacted support, removing the solvent, and drying the product.

2. A process as claimed in claim 1 wherein said support is selected from the group consisting of silica, alumina, silica-alumina, and the mixtures thereof.

3. A process as claimed in claim 1 wherein said support is activated by heating to a temperature of 150 to 350° C. and for a period of 12 to 36 hours.

4. A process as claimed in claim 1 wherein the support is refluxed with a solution of aluminum chloride for a period of 3 to 10 hours.

5. A process as claimed in claim 1 wherein anhydrous aluminum chloride is deposited on said support in vapor phase by packing the activated support into a column and passing vapors of anhydrous aluminum chloride diluted with an inert carrier gas through the column.

6. A process as claimed in claim 5 wherein the packed column is maintained at a temperature of 50 to 150° C.

7. A process as claimed in claim 1 wherein the aluminum alkyl is an organo aluminum compound having the general formula $R_nAlX_{(3-n)}$ where $R_n$ is an alkyl group containing 1–6 carbon atoms and X is a halogen selected from the group consisting of F, Cl, and Br and n has a value between 0.5 to 2.0.

8. A process as claimed in claim 1 wherein the support has a surface area in the range of 50 to 500 $m^2/g$.

9. A process as claimed in claim 7 wherein X is Cl and n equals to 2.

10. A process as claimed in claim 1 wherein the aluminum halide is dissolved in a chlorinated organic solvent selected from the group consisting of carbon tetrachloride, 1,2-dichloroethane, chloroform, chlorobenzenes, and chlorotoluenes.

11. A process as claimed in claim 3 wherein said support is activated by heating to a temperature of 160 to 175° C. and for a period of 12 to 36 hours.

12. A process as claimed in claim 6 wherein the packed column is maintained at a temperature of 75 to 100° C.

13. A process as claimed in claim 9 wherein the organo aluminum compound is diethylaluminum chloride.

* * * * *